United States Patent [19]
Fujita et al.

[11] Patent Number: 5,963,712
[45] Date of Patent: Oct. 5, 1999

[54] SELECTIVELY CONFIGURABLE ROBOT APPARATUS

[75] Inventors: Masahiro Fujita, Saitama; Koji Kageyama; Takayuki Sakamoto, both of Kanagawa; Naohiro Fukumura, Tokyo, all of Japan

[73] Assignee: Sony Corporation, Tokyo, Japan

[21] Appl. No.: 08/887,624

[22] Filed: Jul. 3, 1997

[30] Foreign Application Priority Data

Jul. 8, 1996 [JP] Japan ................................. 8-196989
Jan. 31, 1997 [JP] Japan ................................. 9-019040

[51] Int. Cl.⁶ ................................................. G05B 15/00
[52] U.S. Cl. ............................... 395/99; 395/80; 395/85; 318/568.12
[58] Field of Search ................................. 395/80, 84, 99, 395/908; 901/1; 318/568.12; 364/191–193, 167.02

[56] References Cited

U.S. PATENT DOCUMENTS

| | | | |
|---|---|---|---|
| 4,488,241 | 12/1984 | Hutchins et al. | 395/84 |
| 4,954,952 | 9/1990 | Ubhayakar et al. | 395/99 |
| 5,426,586 | 6/1995 | Ozawa | 395/85 X |
| 5,428,713 | 6/1995 | Matsumaru | 395/80 |
| 5,523,662 | 6/1996 | Goldenberg et al. | 318/568.12 X |

FOREIGN PATENT DOCUMENTS 0 400 624 12/1990 European Pat. Off. .
WO 90/06546 6/1990 WIPO .

OTHER PUBLICATIONS

Patent Abstracts of Japan, JP 05 004181, Jan. 14, 1993.
Patent Abstracts of Japan, vol. 014, JP 01 296350, Nov. 29, 1989.
Patent Abstracts of Japan, vol. 013, JP 63 241613, Oct. 6, 1988.
Patent Abstracts of Japan, vol. 017, JP 05 245784, Sep. 24, 1993.

*Primary Examiner*—William Grant
*Assistant Examiner*—Chad Rapp
*Attorney, Agent, or Firm*—Frommer, Lawrence & Haug, LLP; William S. Frommer

[57] ABSTRACT

A robot apparatus composed of a plurality of component units comprises a first storage unit for storing shape information for determining shapes of the component units, a second storage unit for storing motion information required to describe motions of the component units, a third storage unit for storing characteristic information on electric parts contained in the component parts, and a detector for detecting coupling states of the respective component units. A controller can automatically recognize the entire structure and motion characteristics of the respective component units based on the detection results of the detector. Thus, it is possible to realize a robot apparatus which can be applied to a configuration including two or more separate groups of arbitrary component units combined into a complete assembly, and thus facilitate the architecture of a new form.

14 Claims, 12 Drawing Sheets

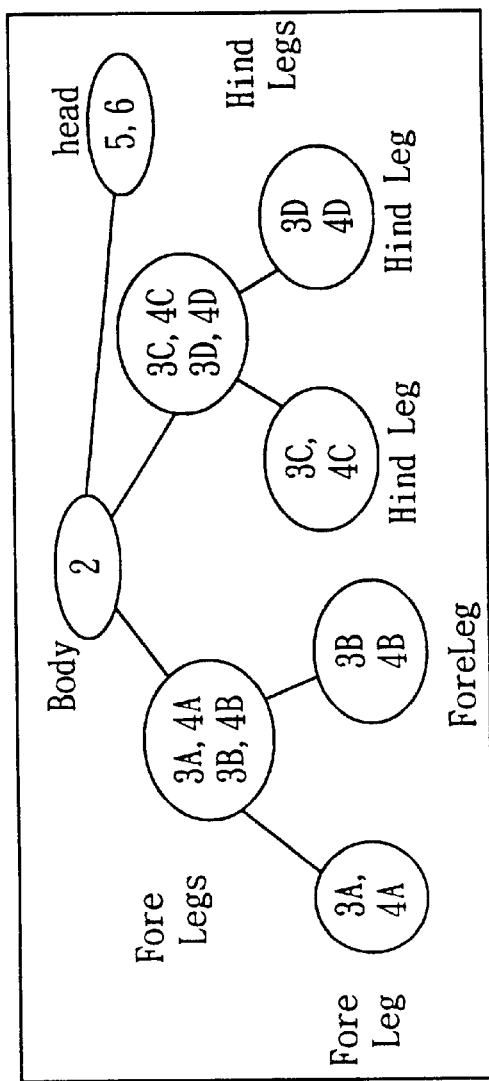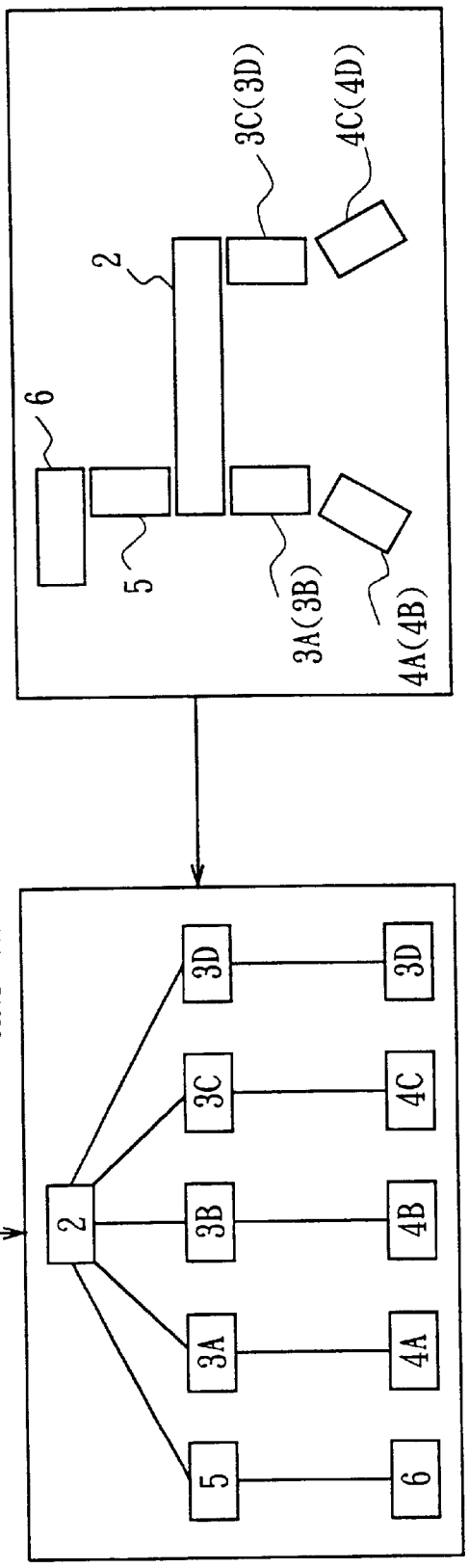

SELECTIVELY CONFIGURABLE ROBOT APPARATUS

BACKGROUND OF THE INVENTION

1. Field of the Invention

This invention relates to a robot apparatus, and more particularly, is suitably applied to a robot apparatus which utilizes a CPU to instruct and control motions thereof.

2. Description of the Related Art

Many of robots are assembled in a predetermined form by a variety of component units including a body, legs, a head, and so on respectively combined in predetermined states defined by a predetermined correlation of the component units.

In such a structure, a robot has a control unit having structure of a microcomputer including a CPU as well as actuators having a predetermined degree of freedom and sensors for detecting predetermined physical amounts, and so on, which are placed at their respective predetermined positions. The control unit individually controls the operations of the respective actuators based on outputs of the respective sensors, associated programs, and so on, thereby enabling the robot to autonomously run and perform predetermined operations.

As an alternative, in recent years, for example, as disclosed in Japanese Patent Laid Open 245784/93, a robot which can be constructed in a desired form by combining a plurality of joint modules and a plurality of arm modules has been considered.

The robot disclosed in Japanese Patent Laid Open 245784/93 has a function of setting a unique number to each joint module. A control unit can recognize a connection order in which respective joint modules are connected, based on the unique numbers of the joint modules provided thereto through communications between the control unit and the joint modules, and rewrite a control program in an appropriate program based on recognition results.

This configuration allows the robot to eliminate a sequence of operations required to create software at the site for assembling the robot (for example, editing, compilation, link, and so on of programs).

In the robot configured as described above, however, the control unit recognizes the connection order for the respective joint modules based on the unique numbers thereof, so that if the connection order for the joint modules is to be changed, new unique numbers must be set again to the respective joint modules corresponding to the change.

In addition, since the foregoing Japanese Patent Laid Open 245784/93 is intended to provide a manipulator device, the contents disclosed in Japanese Patent Laid Open 245784/93 are not sufficient to support a robot including two or more separate groups of component units and support a robot utilizing a variety of sensors such as a microphone, a camera, and so on.

For example, in a robot composed of a plurality of component units, if a control unit controlling the operation of the robot can automatically acquire information required to control operations of the component units, such as the shapes of respective component units, positions of parts such as actuators and a variety of sensors, capabilities of these parts, and so on, the control unit can automatically create a corresponding program even when two or more separate groups of component units are combined into a complete assembly, when a new component unit is added or removed or a component unit is repositioned. Therefore, the architecture of a robot in a new form can be facilitated.

SUMMARY OF THE INVENTION

In view of the foregoing, an object of this invention is to provide a robot apparatus which is applicable to a case where two or more separate groups of arbitrary component units are combined into a complete assembly, and is capable of facilitating the architecture of a robot in a new form.

The foregoing object and other objects of the invention have been achieved by the provision of a robot apparatus composed of a plurality of component units. The robot apparatus comprises first storage means for storing shape information for determining shapes of the component units, second storage means for storing motion information required to describe motions of the component units, third storage means for storing characteristic information on electronic parts contained in the component units, and detecting means for detecting coupling states of the respective component units.

With the configuration described above, the control means can automatically recognize the entire structure and the motion characteristics of the respective component units based on detection results provided by the detecting means.

Also, in the present invention, each of storage means of the respective component units constituting the robot apparatus stores a conversion program for converting first data, represented in a predetermined data format commonly determined beforehand for each function of the electronic parts by a control program used by the control means for controlling the respective component units, into second data represented in a data format used by the respective electronic parts for each function.

As a result, the respective component units can be designed independent of the data format previously determined by the control program.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5A to 5C are schematic diagrams explaining how each site of a virtual robot is specified;

DETAILED DESCRIPTION OF THE EMBODIMENT

Preferred embodiment of this invention will be described with reference to the accompanying drawings:

(1) First Embodiment

Figure 1:
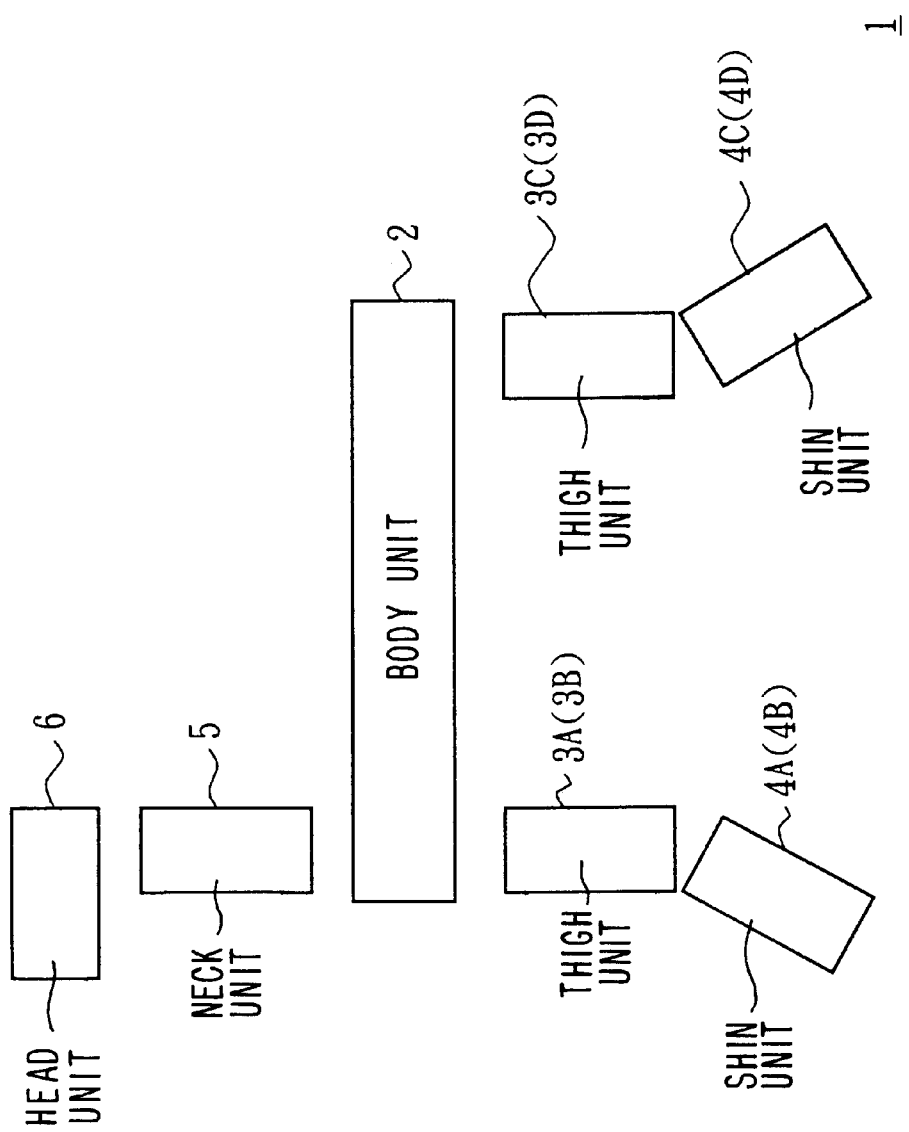
FIG. 1 is a schematic diagram illustrating the configuration of a robot according to a first embodiment.

Referring to FIG. 1, numeral 1 generally shows a robot according to a first embodiment, in which thigh units 3A to 3D and shin units 4A to 4D are removably mounted in order at four corners, i.e., front, rear, left, and right corners of a body unit 2, and a neck unit 5 and a head unit 6 are removably mounted in order at a central portion of a front end of the body unit 2.

Figure 2:
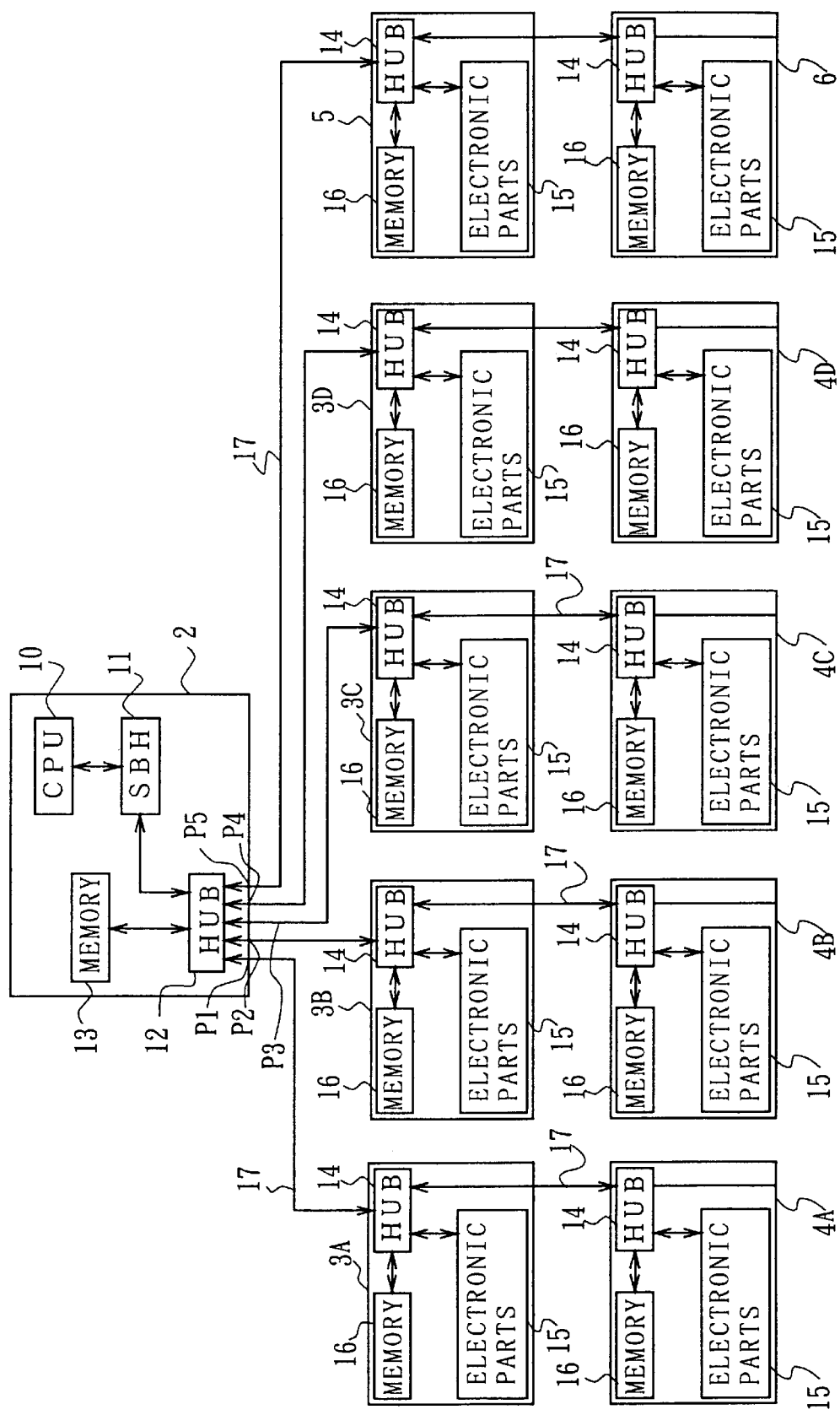
FIG. 2 is a block diagram illustrating the configuration of the robot according to the first embodiment.

In this embodiment, as illustrated in FIG. 2, the body unit 2 contains a central processing unit (CPU) 10 for controlling the operation of the entire robot 1, a serial bus host (SBH) 11 for managing a serial bus described later, a distributor (HUB) 12, and a memory 13. The memory 13 stores information on the shape of the body unit 2 such as the width, length, and so on (hereinafter, called "shape information"), information required to describe motions of the body unit 2 such as the mass, rotation moment, center of the axis of rotation, position of the center of gravity, and so on of the body unit 2 (hereinafter, collectively called "motion information"), positional information on respective joining points p1 to p5 of the HUB 12, and so on.

Each of the component units 3A to 3D, 4A to 4D, 5, 6, except for the body unit 2, contains an HUB 14, electronic parts 15 such as actuators and sensors, and a memory 16. Each of the memories 16 of the respective components units 3A to 3D, 4A to 4D, 5, 6 stores shape information and motion information on the corresponding unit of the component units 3A to 3D, 4A to 4D, 5, 6, information on functions and characteristics of respective electronic parts 15 contained in the corresponding unit of the component units 3A to 3D, 4A to 4D, 5, 6 (hereinafter, called the "characteristic information"), and so on.

Further, the HUB 12 of the body unit 2 is connected to the HUBs 14 of the neck unit 5 and the respective thigh units 3A to 3D through serial buses 17 such as the institute of electrical and electronics engineers, Inc. (IEEE) 1934, the universal serial bus (USB), or the like. In addition, the HUBs 14 of the neck unit 5 and the respective thigh units 3A to 3D are respectively connected to the HUB 14 of the head unit 6 and to the HUBs 14 of the corresponding shin units 4A to 4D through the similar serial buses 17.

The above configuration enables the CPU 10 of the robot 1 to read a variety of information stored in the memories 16 of the respective component units 3A to 3D, 4A to 4D, 5, 6, to send control signals to the actuators disposed in the respective component units 3A to 3D, 4A to 4D, 5, 6, and to receive outputs of sensors disposed in the respective component units 3A to 3D, 4A to 4D, 5, 6, sequentially through the SBH 11, the HUB 12 and the HUBs 14 of the respective component units 3A to 3D, 4A to 4D, 5, 6.

Thus, in the robot 1 of this embodiment, the CPU 10 can automatically grasp the configuration of the entire robot 1, i.e., which of component units 3A to 3D, 5 are coupled to which portions of the body unit 2, and which of the component units 4A to 4D, 6 are coupled to the component units 3A to 3D, 5, in accordance with the positional information on the respective joining points p1 to p5 of the HUB 12 stored in the memory 13 of the body unit 2 and the shape information respectively stored in the memories 16 of the component units 3A to 3D, 4A to 4D, 5, 6 except for the body unit 2. While, the CPU 10 can drive the component units 3A to 3D, 4A to 4D, 5, 6 in desired conditions by driving the actuators disposed in the desired component units 3A to 3D, 4A to 4D, 5, 6 in accordance with the motion information, the characteristic information and so on stored in the memories 16 of the respective component units 3A to 3D, 4A to 4D, 5, 6 except for the body unit 2. At this time, the CPU can also monitor the current states of the component units 3A to 3D, 4A to 4D, 5, 6 by the outputs of the sensors disposed in the respective component units 3A to 3D, 4A to 4D, 5, 6.

In practice, the memories 16 of the respective component units 3A to 3D, 4A to 4D, 5, 6 store, as the characteristic information on the actuators constituting the corresponding electronic parts 15, for example, information such as the type of each actuator (linear type or rotary type), information describing, for example, "a control signal composed of a pulse signal including ten pulses is required to advance the rotating angle by one degree", and so on.

In operation, the CPU 10 reads information as mentioned above from the memories 16 of the respective component units 3A to 3D, 4A to 4D, 5, 6, and creates a conversion program for converting angle data, for example one degree, into a pulse signal having ten pulses which represents the movement distance of a linear motion in accordance with the read information. Subsequently, the CPU 10 sends a control signal in accordance with the movement distance, obtained by the conversion program, to the component unit 4A to control the operation of the actuator disposed in the component unit 4A.

Figure 3:
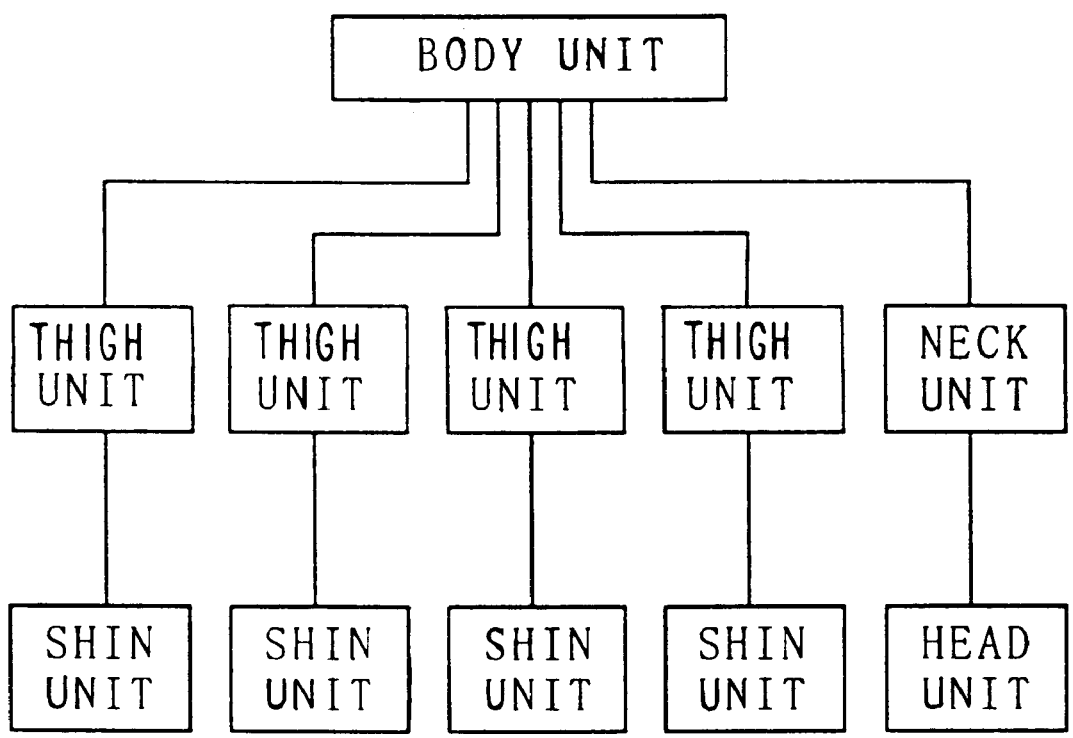
FIG. 3 is a schematic diagram illustrating a tree structure related to coupling of respective component units.

In this embodiment, the CPU 10 creates a tree with respect to connections of the respective component units 2, 3A to 3D, 4A to 4D, 5, 6 as illustrated in FIG. 3 in accordance with information showing which of the component units 2, 3A to 3D, 4A to 4D, 5, 6 are connected to which component units 2, 3A to 3D, 4A to 4D, 5, 6, and stores the tree as data of a directed graph data structure (hereinafter, the structure is called as the "virtual robot") in the memory 13 of the body unit 2.

Also, in this embodiment, the CPU 10 sequentially reads the shape information on the respective component units 2, 3A to 3D, 4A to 4D, 5, 6 stored in the memories 13 and 16 of the corresponding component units 2, 3A to 3D, 4A to 4D, 5, 6 in a time division manner at predetermined intervals to check the entire structure.

Figure 4:
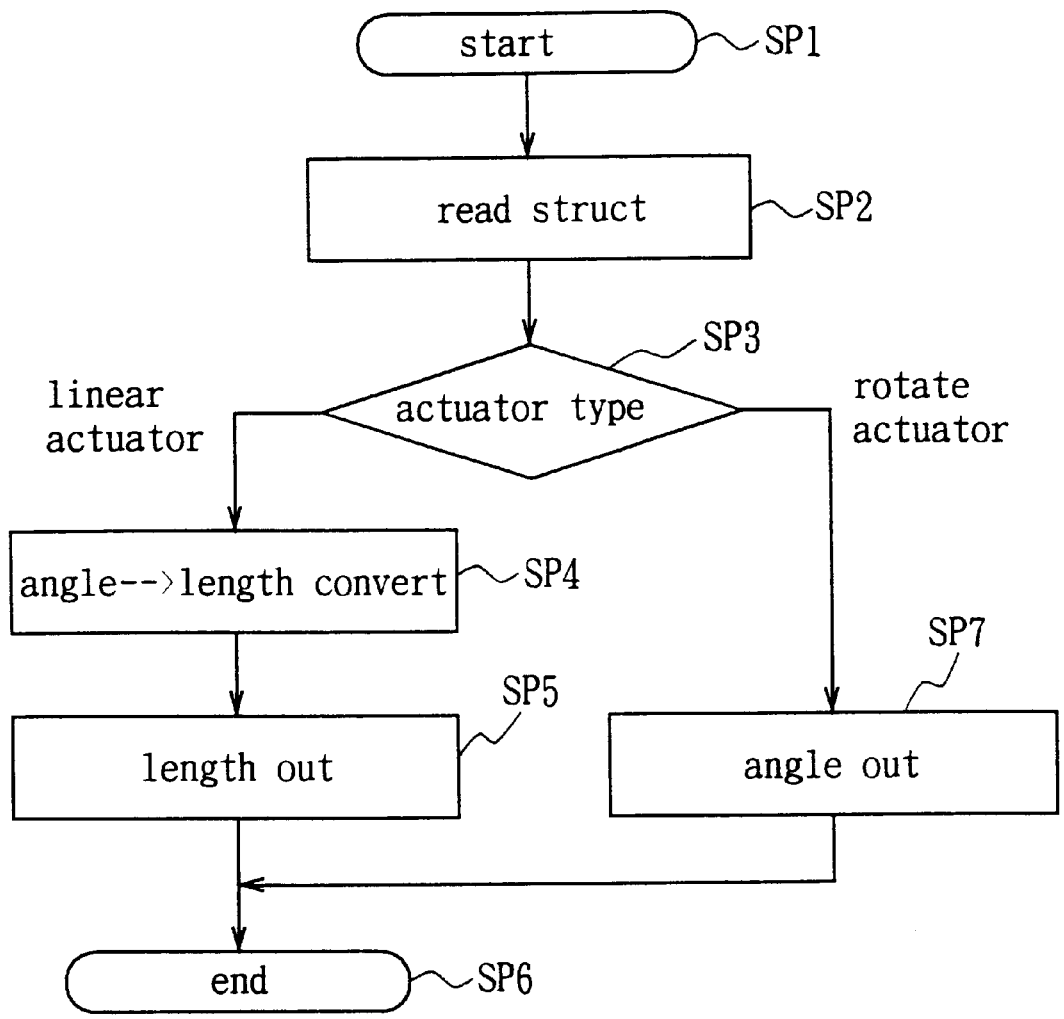
FIG. 4 is a flow chart explaining a control procedure for the robot executed by a CPU in the first embodiment.

Here, a control procedure executed by the CPU 10 for controlling the robot 1 will be described with reference to a flow chart illustrated in FIG. 4. The case of controlling the operation of an actuator included in the electronic parts 15 of the thigh unit 3A will be described here as an example.

First, the CPU 10 starts a control processing for the robot 1 at step SP1, and reads a variety of information from the memory 16 of the thigh unit 3A at step SP2. Then, at the subsequent step SP3, the CPU 10 determines the type of actuator disposed in the thigh unit 3A in accordance with the variety of read information. If it is decided that the actuator of the thigh unit 3A is linear type, the control processing proceeds to step SP4.

At step SP4, the CPU 10 converts a predetermined angle data (angle) into a movement distance (length) of linear motion, and then sends a control signal corresponding to the movement distance (length) to the actuator of the thigh unit 3A at step SP5, to terminate the control processing for the robot 1 at step SP6.

On the other hand, if the CPU 10 decides at step SP3 that the actuator of the thin unit 3A is rotary type, the control processing proceeds to step SP7, where the CPU 10 sends a control signal corresponding to the predetermined angle data (angle) as it is to the actuator of the thigh unit 3A, to terminate the control processing for the robot 1 at step SP6.

The foregoing processing procedure can be similarly applied to the remaining component units 3B to 3D, 4A to 4D, 5, 6.

Actually, in the robot 1, the CPU 10 may read a variety of data only once when the respective component units 3A to 3D, 4A to 4D, 5, 6 are coupled to the body unit 2. Therefore, the CPU 10 of the robot 1 is configured to subsequently set a movement distance to each of the remaining component units 3A to 3D, 4A to 4D, 5, 6 coupled to the body unit 2 at a predetermined timing.

In the robot 1 configured as described above, the CPU 10 grasps the entire structure of the robot 1 in accordance the shape information, motion information, and characteristic information related to the component units 2, 3A to 3D, 4A to 4D, 5, 6 stored in the memories 13 and 16 of the component units 2, 3A to 3D, 4A to 4D, 5, 6, and controls the operations of the respective component units 2, 3A to 3D, 4A to 4D, 5, 6.

Thus, in the robot 1, the CPU 10 can always grasp the entire structure of the robot 1 and control the operations of the respective component units 2, 3A to 3D, 4A to 4D, 5, 6 irrespective of a combination of the component units 2, 3A to 3D, 4A to 4D, 5, 6.

Here, two cases, (A) and (B), are considered with respect to the programming for a robot. In the case (A), a designer, who is to create a program for controlling the robot, knows respective component units of the robot to be used by himself, and also knows how to combine them for use. The programming for general autonomous robots or the like falls under this case. In the other case (B), the user freely selects the component units of a robot and freely combines them into a complete assembly. The programming for the robot 1 of this embodiment falls under that is case.

Further, there can be thought two specifying methods for a robot (virtual robot) automatically recognized by a system, i.e., which part constitutes the head of the robot, which part constitutes the forelegs of the robot, and so on. One method (1) is that a designer provides such information, and the other method (2) is that such specifying information is added to a variety of information stored in respective component units.

In the former specifying method (1), a designer provides specifying information for a blue print robot (a robot having a data structure designed by the designer) 18 illustrated in FIG. 5A. The specifying information are that respective parts of the blue print robot 18 having certain functions and composed of one or more component units are designated as a head, forelegs, and so on, and where the respective sites are positioned. The blue print robot of FIG. 6A means that the component units 5, 6 of the physical robot (real robot) 1 of FIG. 1 constitute a head of the blue print robot 18; the component units 3A and 4A right forelegs; the component units 3B and 4B left forelegs; the component units 3C and 4C right hind legs; the component units 3D and 4D left hind legs; the component units 3A, 3A, 3B, and 4B foreleg portions; the component units 3C, 4C, 3D, and 4D hind leg portions; and all the component units complete the entire robot. Of course, more detailed specification can also be provided for the component units 3A to 3D, 4A to 4D, 5, 6, for example, the left hind leg can be classified by the shin unit 4C and the thigh unit 3C.

In the former case (A) of the programming for the robot, the designer corresponds the blue print robot to the virtual robot to communicate information between the blue print robot and the actual component units only using the blue print robot.

On the other hand, in the latter case (B) of the programming for the robot, it is difficult to create a program for an autonomous robot. This is because it is unknown at the time of creating a program as to whether the robot has tires, how many legs the robot has, and so on.

It is however possible to read information on the virtual robot, transfer data to a personal computer, and depict a current shape of the robot from the tree structure on a display of the personal computer.

In this case (that is, in the case (B)), the respective component units of the robot can be interactively moved using the graphical user interface (GUI) on the personal computer. For actually performing the interactive operation, the virtual robot in the system may be transferred to the personal computer.

Also, in this case, an alternative system may also be built in a manner contrary to the above. Specifically, the personal computer may be provided with predetermined design drawings showing how respective component units are coupled (actually, the design drawings have the same data structure as that of the virtual robot), such that the personal computer compares in shape currently used component units sent thereto from the robot with the respective component units on the design drawings to inform the user that erroneous component units are used, the coupling order is not correct, or the like, for example, by flashing corresponding positions on a robot image graphically represented on the display of the personal computer.

By summarizing the aforementioned configuration, there are the following cases (A) and (B), as a programming method. (A) the case where a designer knows the configuration of a robot. (B) the case where a user can freely change the configuration of a robot.

Further, there are the following methods (1) and (2) in regard to information of whether which parts or combinations of which parts are effective.
(1) a designer gives the information.
(2) the information is previously stored in the parts.

Here, in a combination of (A) and (1), since the designer knows configurations of parts and functions of the robot beforehand, the information can be reflected at the time of programming. If (A) and (2) are combined, the designer can previously know the information stored in the parts, so that the program is created as the same with the combination of (A) and (1).

On the other hand, in a combination of (B) and (1), as described above, motions and functions are interactively applied by using the PC or the like.

In a combination of (B) and (2), the user use a combination of certain parts as function parts. In the case, there are two control methods. The former method is a method of interactively generating motions of the function parts. The latter method is a method of using motion data which is prepared for using the previously corresponding sites as the corresponding functions. Further, as described later, a device driver corresponding to functional information can be stored in the respective memories.

According to the foregoing configuration, the respective component units 2, 3A to 3D, 4A to 4D, 5, 6 contain the memories 13 and 16 which store shape information, motion information and so on of the corresponding component units 2, 3A to 3D, 4A to 4D, 5, 6, and the CPU 10 can read a variety of information respectively stored in the memories 13 and 16 of the component units 2, 3A to 3D, 4A to 4D, 5, 6 as required, so that the CPU 10 can grasp the entire structure of the robot 1 irrespective of coupling states of the component units 2, 3A to 3D, 4A to 4D, 5, 6, and control the operations of the respective component units 2, 3A to 3D, 4A to 4D, 5, 6. Thereby making it possible to realize a robot apparatus which can be applied to a configuration including two or more separate groups of arbitrary component units combined into a complete assembly, and thus facilitate the architecture of a robot in a new form.

(2) Second Embodiment

Next, it is considered that an entire robot having two hands, two legs and a head is provided with autonomy.

Figure 6:
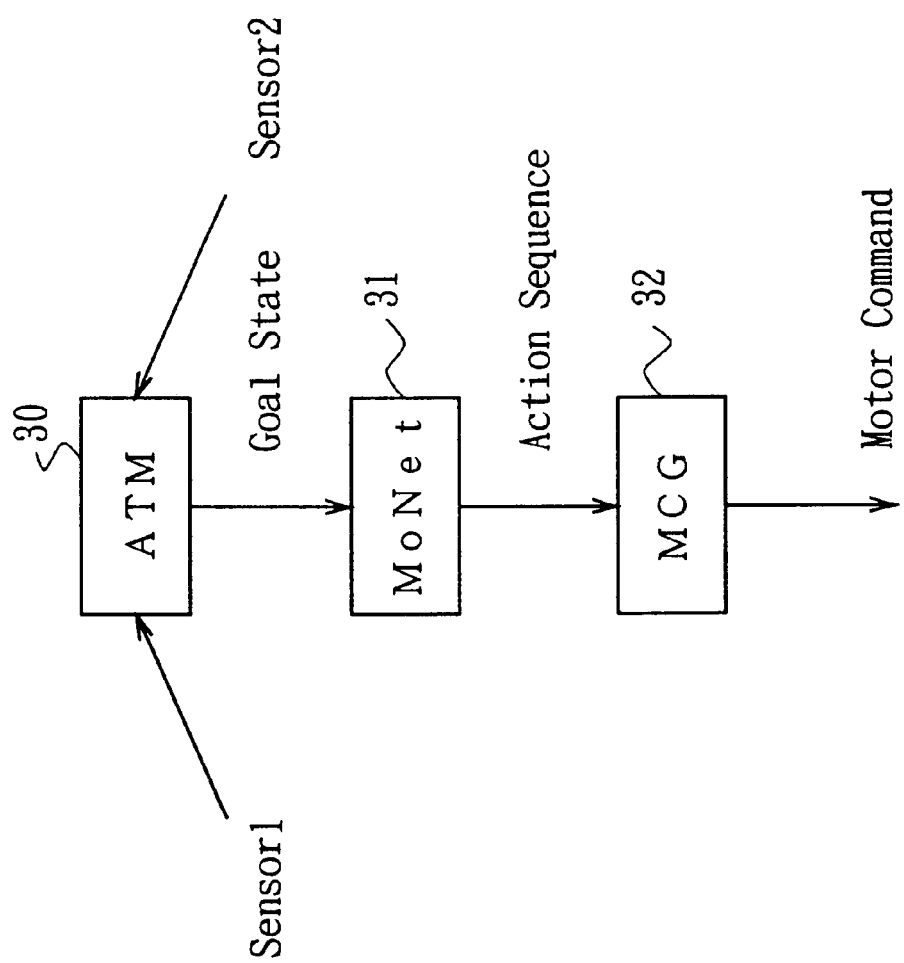
FIG. 6 is a schematic diagram illustrating a functional block structure for providing an entire robot with autonomy.
Figure 7:
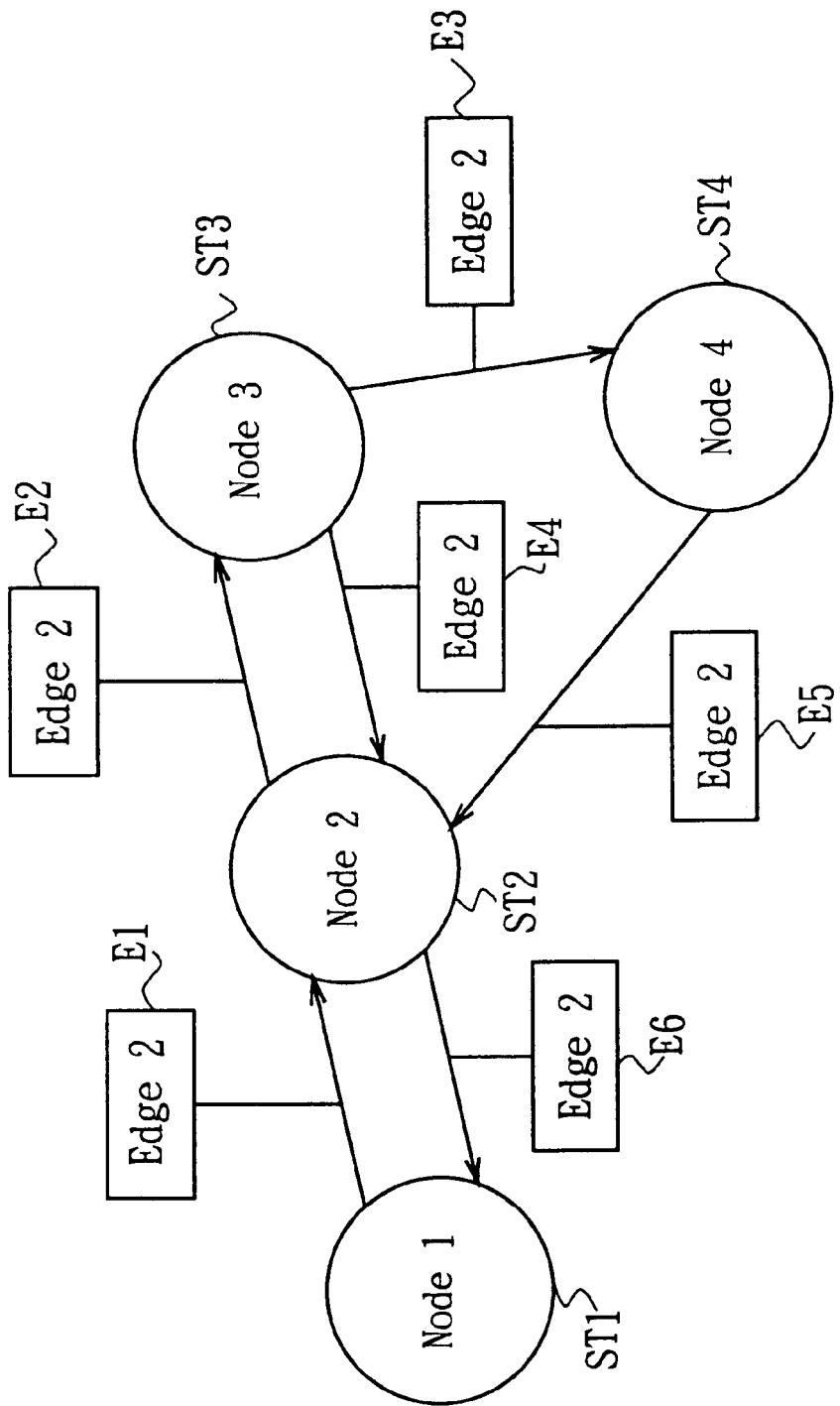
FIG. 7 is a schematic diagram illustrating a graph structure of MoNet.

In this case, the provision of autonomy may be seemingly realized by a functional block structure as illustrated in FIG. 6. More specifically, an automaton 30 is a higher rank program for giving the goal for the action of the robot based on outputs of sensors disposed in respective component units, and a MoNet 31 is a lower rank program having a graph structure as illustrated in FIG. 7 for restricting transitions of the attitude of the robot.

An output from the MoNet 31 is time series of Nodes (attitude, state) ST1 to ST4 of the graph structure, and Edges (programs for changing the attitude) E1 to E6 between the respective Nodes ST1 to ST4 store programs for controlling actuators (hereinafter, called the "motors") of respective component units such as a head and legs. A motor command generator 32 (MCG) (FIG. 6) uses the programs stored in the Edges E1 to E6 to generate commands to the respective motors in the entire robot and outputs the commands to the associated motors.

In summary, the second embodiment is intended to achieve complicated operations of the robot by a combination of coordinated operations of the respective component units and independent operations of the respective component units. Specifically, the respective component units such as the head, hands, legs and so on of the robot as well as the entire robot are provided with the autonomy as mentioned above such that the respective component units can independently operate based on outputs of sensors disposed in the respective component units and also operate in response to instructions given thereto from the control unit which collectively governs the respective component units.

Figure 8:
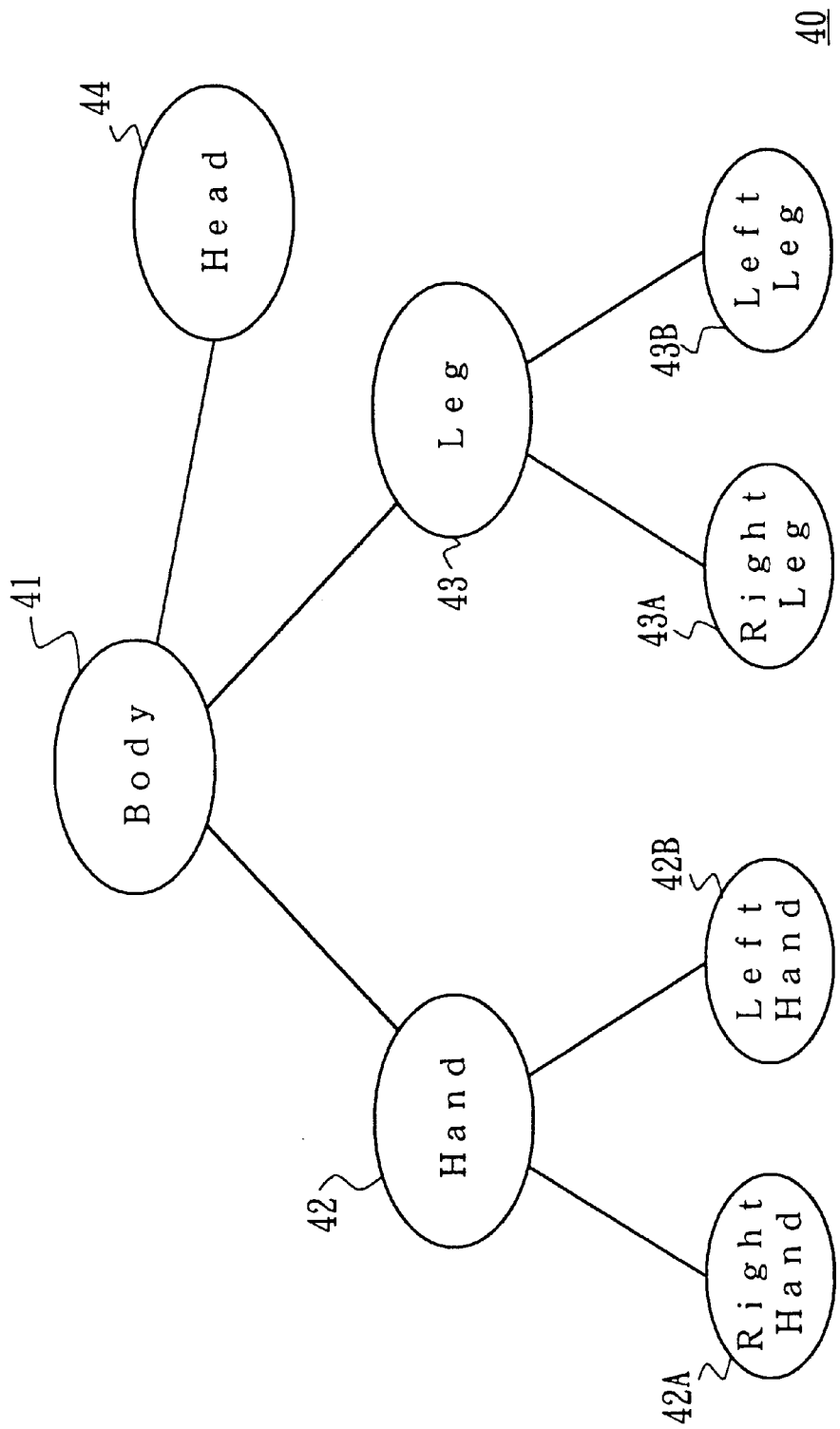
FIG. 8 is a schematic diagram illustrating a conceptual configuration of a robot according to a second embodiment.

FIG. 8 illustrates the configuration of a robot 40 according to the second embodiment which has two hand blocks, two leg blocks and a head block. In the aforementioned first embodiment, the body unit 2 is physically connected to a head block composed of the neck unit 5 and the head unit 6 and to four leg blocks composed of the thigh units 3A to 3D and the shin units 4A to 4D. Whereas in FIG. 8, a body block 41 is logically connected to a hand block 42, a leg block 43 and a head block 44, and the hand block 42 and the leg block 43 are further connected to left and right component blocks 42A, 42B, 43A, 43B, respectively.

Figure 9:
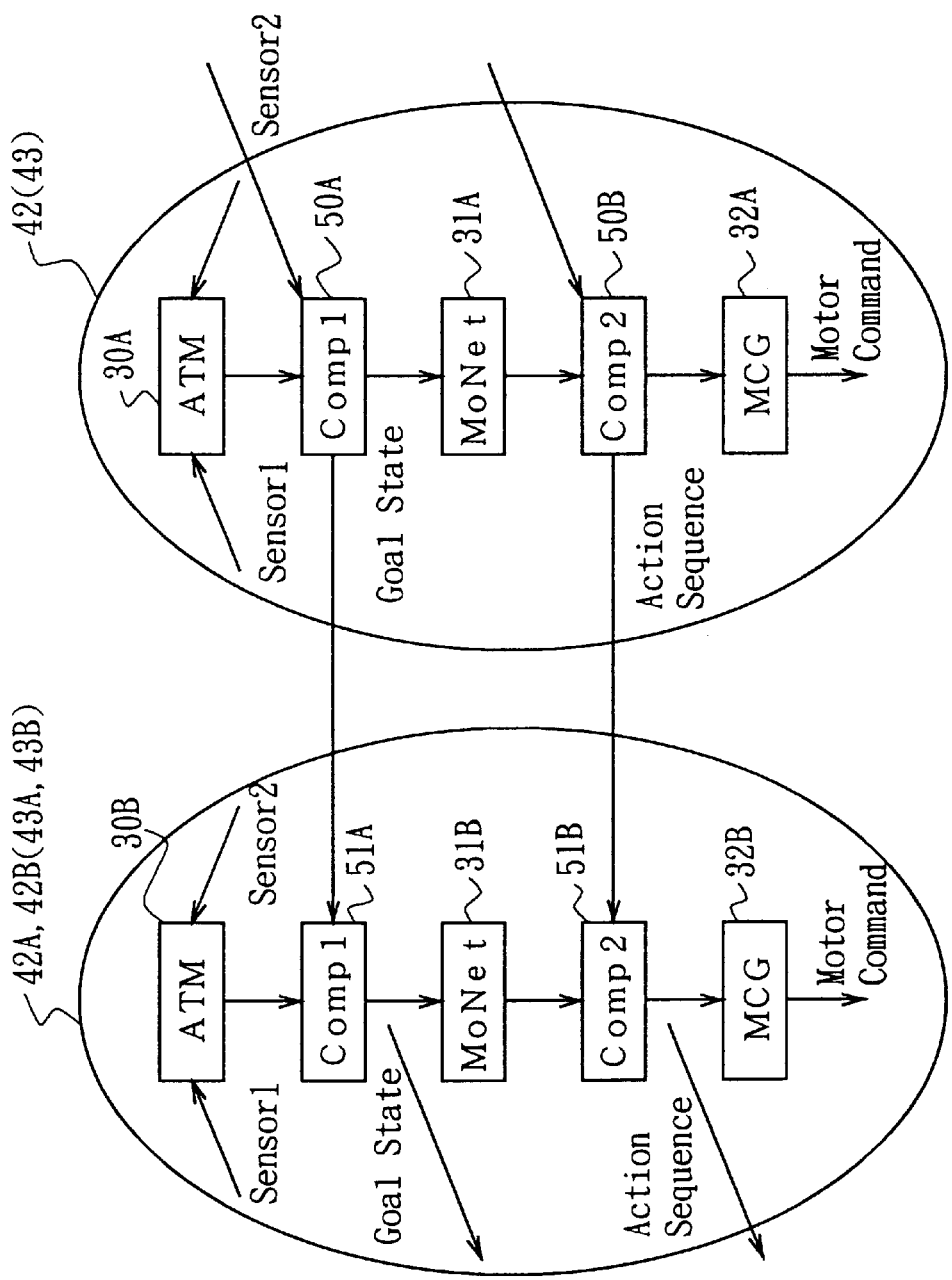
FIG. 9 is a conceptual diagram explaining functions of respective component units.

FIG. 9 illustrates functions of the respective component blocks 42, 43, 42A, 42B, 43A, 43B illustrated in FIG. 8. Similarly to the functional block structure illustrated in FIG. 6, the component blocks 42, 43 are each composed of an automaton 30A, MoNet 31A and MCG 32A, while the component blocks 42A, 42B, 43A, 43B are each composed of an automaton 30B, MoNet 31B and MCG 32B.

It should be noted however that two groups of instructions exist in the respective component blocks 42, 43, 42A, 42B, 43A, 43B, i.e., a group of instructions issued within the component blocks themselves 41 to 44, 42A, 42B, 43A, 43B and a group of instructions generated in higher ranks of a tree structure and inputted thereto. Thus, first Comps 50A and 51A and second Comps 50B and 51B are provided for selecting one of the two groups by making them contend with each other.

When outputs of the first Comps and second Comps are inputted to the MoNet 31A, 31B or the MCG 32A, 32B of the respective functions, the outputs are simultaneously inputted to the corresponding sites 42A, 42B, 43A, 43B which are branches of the respective component blocks, and similar processing is performed in these sites. Typically, the contention is such that an output from a higher rank is given priority as default setting.

Generally, an autonomous robot implies a problem as to how to treat reflective actions and actions taken in accordance With time consuming plans.

The use of a tree structure for a logical structure of the robot 40 having meaning as illustrated in FIG. 8 is advantageous in giving an answer to the problem. Specifically, lower rank branches (Light Hand, Left Hand, and so on) in the tree structure are released from tasks with a large amount of calculations which must be solved by upper rank branches (Hands, Body, and so on). For example, a task of converting a trajectory of a motion of a hand in a three-dimensional space into angles of respective joints (inverse kinematic calculation) or the like requires a large amount of calculations for a branch at a higher rank. Thus, component units corresponding to hands and legs can make a quick response.

According to the foregoing configuration, each component unit can be provided with autonomy in a robot assembled by combining two or more separate groups of arbitrary component units. Consequently, the robot can achieve complicated motions by executing simpler programs.

(3) Third Embodiment

In a third embodiment, the CPU 10 reads a data structure representing shape information, motion information and characteristic information from the memories 16 of respective component units 3A to 3D, 4A to 4D, 5, 6 as the first embodiment. However, instead of creating a conversion program for each of the component units 3A to 3D, 4A to 4D, 5, 6 based on the read data structure, the third embodiment treats such a conversion program as an object, and previously stores the conversion program in memories 61 (FIG. 10) of the respective component units 3A to 3D, 4A to 4D, 5, 6.

Figure 10:
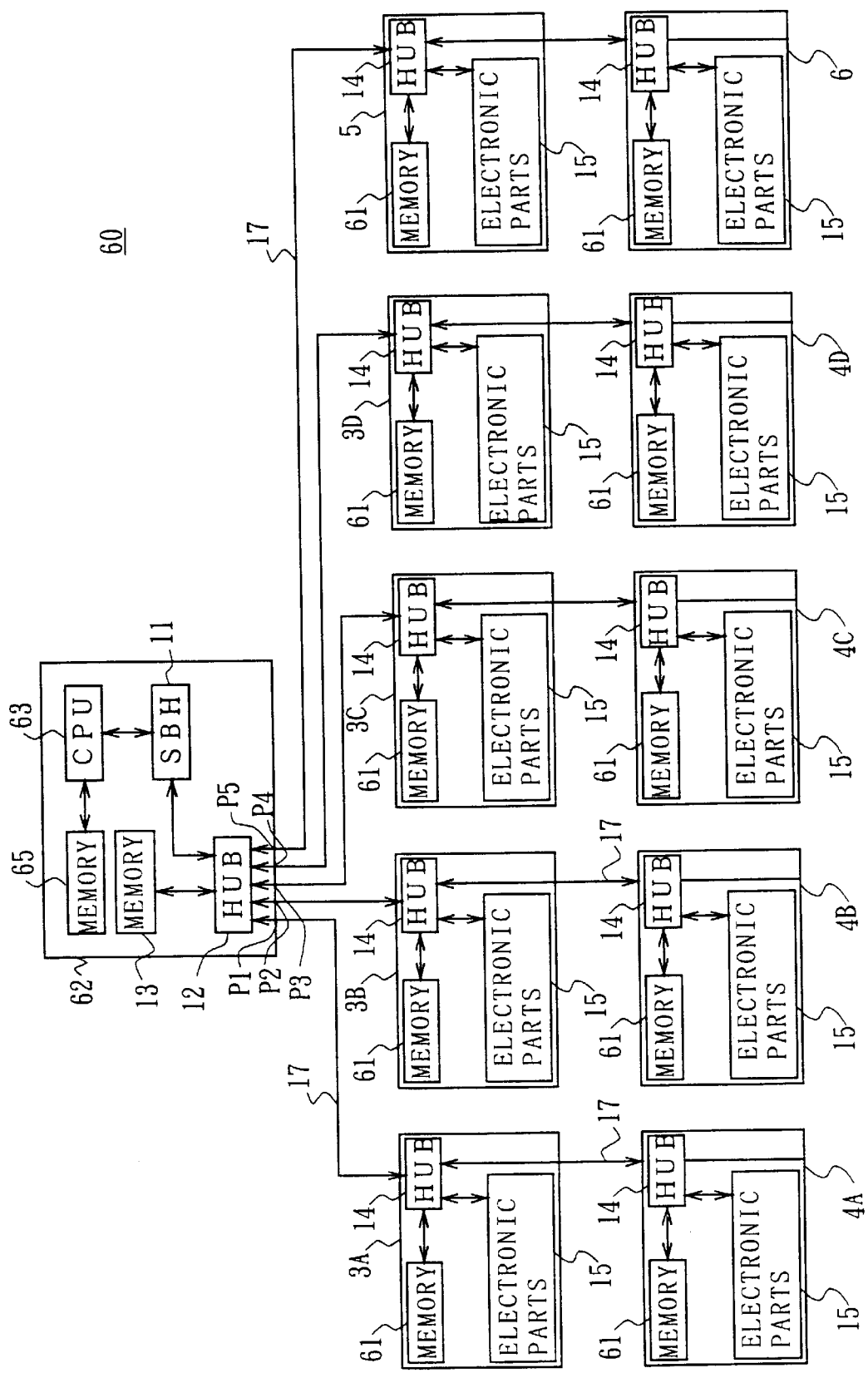
FIG. 10 is a block diagram illustrating the configuration of a robot according to a third embodiment.

More specifically, with reference to FIG. 10, where parts corresponding to those in FIG. 2 are designated the same reference numerals, the memories 61 of the respective component units 3A to 3D, 4A to 4D, 5, 6 store a data structure representing shape information, motion information and characteristic information on the associated component units 3A to 3D, 4A to 4D, 5, 6 as well as an interface program as an information reading program for reading the data structure and a conversion program as objects (since an interface program is called a "method" in object-oriented environment, the interface program in this embodiment is hereinafter called the "method" likewise).

A method for reading the data structure is provided for reading the data structure from the objects read from the memories 61 of the respective component units 3A to 3D, 4A to 4D, 5, 6, and this method is commonly used in all the component units 3A to 3D, 4A to 4D, 5, 6. In practice, a method is defined for each information, such as a method for reading shape information, a method for reading motion information, and a method for reading characteristic information, such that the data structure can be stored in an arbitrary order in the associated memory 61.

The conversion program converts predetermined data (For example, for a function of an electronic part 15 serving as an actuator, a data format applied to an actuator for any component unit has been determined to be given as angle data, by way of example) represented in a predetermined data format commonly determined beforehand for each function of associated electronic parts 15 by a program used by a CPU 63 contained in a body unit 62 for controlling the respective component units 2, 3A to 3D, 4A to 4D, 5, 6 (hereinafter, called the "control program") into data represented by a data format (for example, a length) used by each electronic part 15 for each function. A method is set to each function of parts such as an actuator constituting the electronic parts 15 (i.e., each function of the electronic parts 15).

Thus, if the number of parts constituting the electronic parts 15 in each of the component units 3A to 3D, 4A to 4D, 5, 6 (i.e., the number of functions of the electronic parts 15) is one, there is one method constituting the conversion program. If a plurality of parts constitute the electronic parts 15 in each of the component units 3A to 3D, 4A to 4D, 5, 6, there are the plurality of methods constituting the conversion program, corresponding to the number of parts.

For example, if the electronic part 15 is an actuator to which a rotating angle can be specified for its motion, the user is not conscious of whether the used actuator is an actuator of rotary type as a geared motor or an actuator of linear type as an ultrasonic linear motor which is incorporated in a mechanical system by certain techniques to rotate a joint.

More specifically, if a rotating angle is set using a method for specifying the rotating angle (for example, "void set Angle (Angle Data & angle) ;"), data (for example, rotating angle data) represented in a predetermined data format applied to the actuator previously determined by the control program is converted into data (proper value) represented in a data format used by the actuator, i.e., the electronic part 15, and then transferred on a serial bus 17 as a data series for the electronic parts.

When the respective component units 3A to 3D, 4A to 4D, 5, 6 are coupled to the body unit 62, the CPU 63 reads the objects from the memories 61 of the respective component units 3A to 3D, 4A to 4D, 5, 6 through a system bus 17, and stores the objects in a memory 65 contained in the body unit 62 so as to control the operations of the respective component units 3A to 3D, 4A to 4D, 5, 6 based on the objects corresponding to the respective component units 3A to 3D, 4A to 4D, 5, 6.

Figure 11:
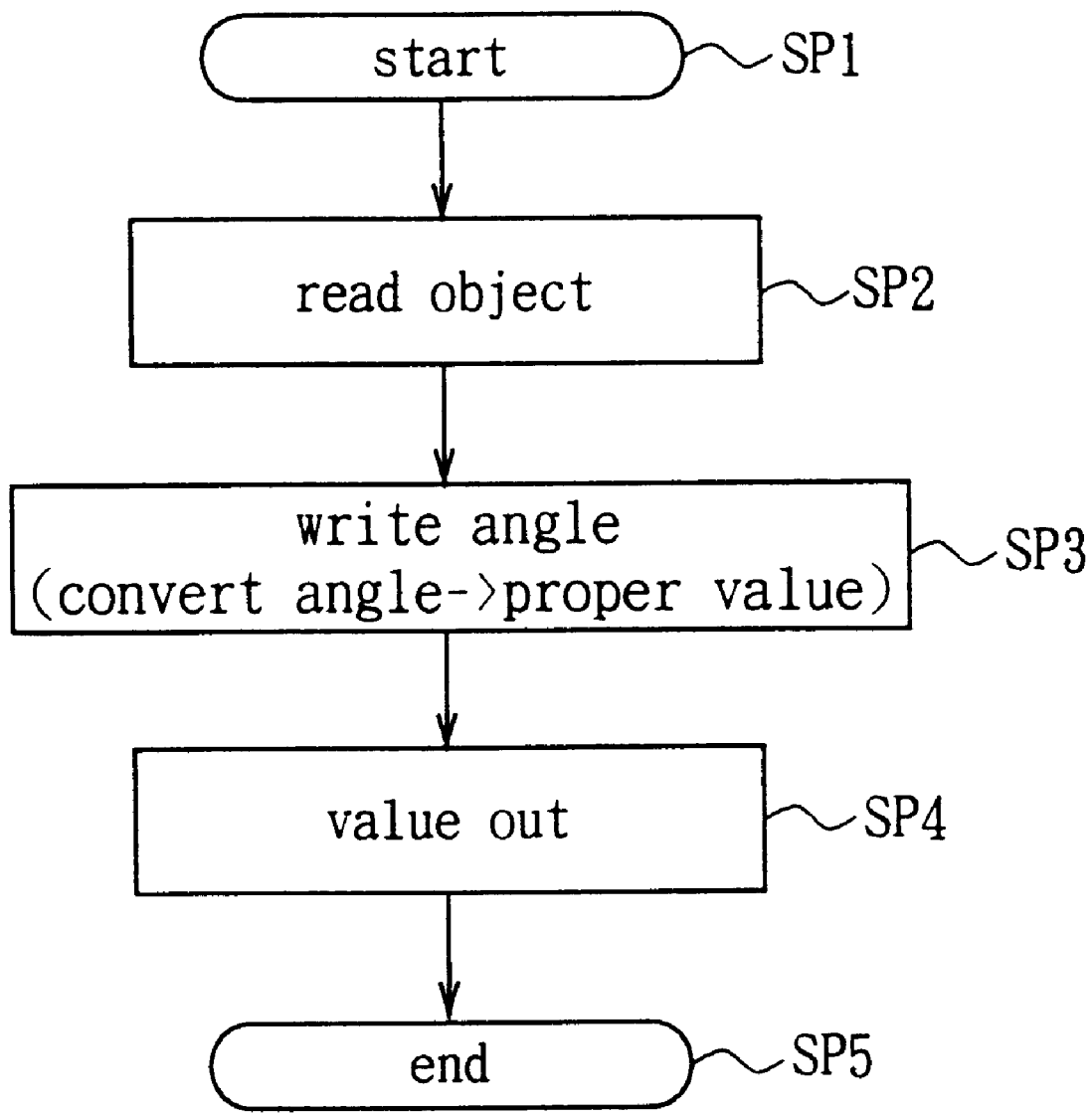
FIG. 11 is a flow chart explaining a control procedure for the robot executed by a CPU in the third embodiment.

Now, a control procedure executed by the CPU 63 for the robot 1 will be explained with reference to a flow chart illustrated in FIG. 11. Given herein as an example is control processing for controlling the operation of an actuator in the electronic parts 15 of the component unit 3A.

First, the CPU 63 starts the control processing for the robot 1 at step SP1, reads objects from the memory 61 of the component unit 3A at step SP2, and subsequently converts at step SP3 predetermined angle w data as first data represented in a predetermined format given by the control program into data (proper value) as second data represented in a data format used by the actuator in the electronic parts 15 based on the conversion program included in the read objects, irrespective of whether the actuator in the electronic parts 15 of the component unit 3A is a linear type or a rotary type.

Next, the CPU 63 sends a control signal corresponding to the proper value to the component unit 3A through the system bus 17 at step SP4 to control the operation of the component unit 3A, and terminates the control processing for the robot 1 at step SP5.

The foregoing processing procedure can be similarly applied to the remaining component units 3B to 3D, 4A to 4D, 5, 6.

In the robot 1, the CPU 63 needs to read the objects only once at the time the component units 3A, 3B, 3C, 3D, 4A, 4B, 4C, 4D, 5, 6 are coupled to the body unit 62. Subsequently, predetermined angles are set to actuators in the respective component units 3A, 3B, 3C, 3D, 4A, 4B, 4C, 4D, 5, 6 coupled to the body unit 62 at predetermined timing.

In the robot 1 configured as described above, for controlling the operations of the component units 3A to 3D, 4A to 4D, 5, 6, the first data represented in a predetermined format determined beforehand for each function of the electronic parts 15 by the control program is converted into the second data represented in a data format used by the electronic parts 15 of the component units 3A to 3D, 4A to 4D, 5, 6 for each function, so that the respective component units 3A to 3D, 4A to 4D, 5, 6 can be designed independently of the data format determined beforehand by the control program.

Stated another way, in the third embodiment, even if a different kind of component unit 3AX is coupled to the body unit 62, for example, in place of the component unit 3A, objects are downloaded from a memory 61X of the component unit 3AX to the CPU 63 at the time the component unit 3AX is coupled to the body unit 62, so that the CPU 63 can control the operation of the component unit 3AX based on a conversion program included in the objects without creating a conversion program based on shape information, motion information and characteristic information stored in the memory 61X of the component unit 3AX.

Thus, the designer may design the component units 3A to 3D, 4A to 4D, 5, 6 such that data convenient to the component units 3A to 3D, 4A to 4D, 5, 6 can be used therefor, and store a conversion program for converting first data into such convenient data in the memory of the each component unit, thereby eliminating the need of creating a different program for each component unit, when the designer designs each of the component unit, so that complicated and time-consuming works are largely reduced during the designing of the component units.

According to the configuration described above, a data structure representing shape information, motion information and characteristic information, a method commonly used for the electronic parts 15 in all of the component units 3A to 3D, 4A to 4D, 5, 6 for reading the data structure from objects, and a conversion program for converting first data represented in a data format commonly determined beforehand for each function of the electronic parts 15 by the control program into second data represented in a data format used by the electronic parts 15 for each function are stored in the memory 61 of each of the component units 3A to 3D, 4A to 4D, 5, 6 as objects, such that the CPU 63 reads the objects from the memories 61 of the component units 3A to 3D, 4A to 4D, 5, 6 at the time the component units 3A to 3D, 4A to 4D, 5, 6 are coupled to the body unit 62, whereby the component units 3A to 3D, 4A to 4D, 5, 6 can be designed independently of the data format determined beforehand by the control program. As a result, it is possible to realize the robot 1 which can significantly improve the degree of freedom in designing the component units.

Further, according to the foregoing configuration, since a method is defined for each information, such as a method for reading shape information, a method for reading motion information, and a method for reading characteristic information, a data structure can be stored in each memory 61 in an arbitrary order.

Further, according to the foregoing configuration, since a new method can be added to the conversion program, specific contents of the operations of the component units 3A to 3D, 4A to 4D, 5, 6 can be readily modified without modifying the component units 3A to 3D, 4A to 4D, 5, 6 themselves.

(4) Other Embodiments

Figure 12:
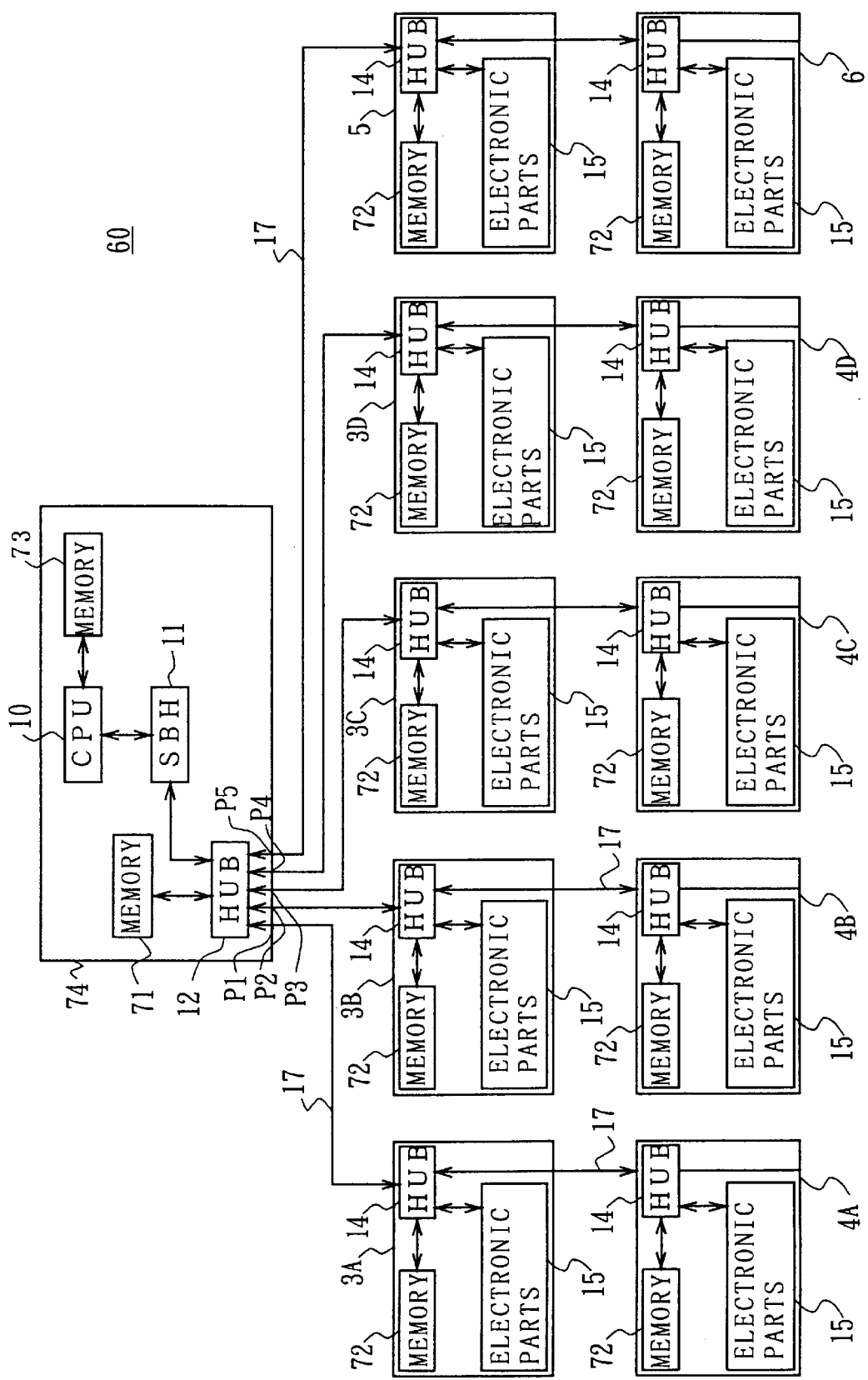
FIG. 12 is a block diagram illustrating another embodiment.

While in the aforementioned first embodiment, the component units 2, 3A to 3D, 4A to 4D, 5, 6 are internally provided with the memories 13 and 16 which store shape information, motion information, characteristic information, and so on of the associated component units 2, 3A to 3D, 4A to 4D, 5, 6, however, the present invention is not limited thereto and as illustrated in FIG. 12 in which parts corresponding to those in FIG. 2 are designated the same reference numerals, memories 71 and 72 of respective component units 2, 3A to 3D, 4A to 4D, 5, 6 store a manufacturer number and a part number of the associated component units 2, 3A to 3D, 4A to 4D, 5, 6, and a body unit 74 is provided therein with a memory 73 (or any other storage means) for storing shape information, motion information, characteristic information, and so on of the component units 2, 3A to 3D, 4A to 4D, 5, 6 corresponding to the manufacturer numbers and the part numbers thereof, such that a CPU 10 detects a tree structure of each of the component units 2, 3A to 3D, 4A to 4D, 5, 6 in accordance the information stored in the memory 73.

Further, while in the aforementioned first embodiment, the memories 13 and 16 is applied as storage means for storing shape information, motion information, characteristic information, and so on on the respective component units 2, 3A to 3D, 4A to 4D, 5, 6, however, the present invention is not limited to thereto and a variety of different storage means can be applied instead. In this case, one or all of the shape information, motion information and characteristic information on the component units 2, 3A to 3D, 4A to 4D, 5, 6 can be stored in separate storage means.

Further, while in the aforementioned embodiments, the shape information on the component units 2, 3A to 3D, 4A to 4D, 5, 6 stored in the associated component units 2, 3A to 3D, 4A to 4D, 5, 6 is width, length, or the like, however, the present invention is not limited thereto and the shape information can include, when assuming a predetermined coordinate system and coordinate axes for any of the component units 2, 3A to 3D, 4A to 4D, 5, 6, a coupling position of the component unit 2, 3A to 3D, 4A to 4D, 5, 6 with one or more of the remaining component units 2, 3A to 3D, 4A to 4D, 5, 6, the position of the center of rotation and the direction of rotation on the aforementioned coordinate system when the component unit 2, 3A to 3D, 4A to 4D, 5 or 6 is rotated, and the position of the origin of a linear motion on the aforementioned coordinate system when the component unit 2, 3A to 3D, 4A to 4D, 5 or 6 is linearly moved.

Similarly, as to the motion information on the respective component units 2, 3A to 3D, 4A to 4D, 5, 6 stored in the memories 13 and 16 of the respective component units 2, 3A to 3D, 4A to 4D, 5, 6, the motion information can include, when assuming a predetermined coordinate system and coordinate axes for any of the component units 2, 3A to 3D, 4A to 4D, 5, 6, the positions of centers of gravity for the component unit 2, 3A to 3D, 4A to 4D, 5 or 6 on the coordinate system, mass of the component unit 2, 3A to 3D, 4A to 4D, 5 or 6, and magnitudes of rotation moments of the component unit 2, 3A to 3D, 4A to 4D, 5 or 6.

Further, while in the aforementioned first and second embodiments, the detecting means for detecting coupling states of the component units 2, 3A to 3D, 4A to 4D, 5, 6 is composed of the CPU 10, the memories 13 and 16, the serial bus 17 and so on, however, the present invention is not limited thereto and a variety of different configuration can be applied.

Further, while in the aforementioned first and second embodiments, the CPU 10 sequentially reads shape information on the component units 2, 3A to 3D, 4A to 4D, 5, 6 stored in the memories 13 and 16 of the respective component units 2, 3A to 3D, 4A to 4D, 5, 6 at predetermined intervals in a time-division manner, to check the entire structure of the robot 1, however, the present invention is not limited thereto and the CPU 10 can detect coupling states among the component units 2, 3A to 3D, 4A to 4D, 5, 6 when the coupling states change.

While in the aforementioned second embodiment, the functions of the components 42, 43, 42A, 42B, 43A and 43B in the robot are organized as illustrated in FIG. 9, however, the present invention is not limited thereto and essentially, a robot apparatus composed of one or a plurality of component units can comprise logical means for logically coupling the component units in a tree structure to configure one or more sites; goal generating means for forcing each of the sites to generate a predetermined first action goal independently of each other; input means for inputting a second action goal outputted from a higher rank of the tree structure; selecting means for selecting the first or second action goal from the first and second action goals; output means for outputting the first or second action goal selected by the selecting means to a lower rank in the tree structure; generating means for generating an action at a current time from the first or second action goal selected by the selecting means; and operation instruction generating means for generating an operation instruction from the action at the current time to an actuator for driving a corresponding component unit.

Further, in the aforementioned third embodiment, data structure representing shape information, motion information and characteristic information, a method for reading the data structure from objects, and a conversion program for converting predetermined data represented in a predetermined format beforehand determined by a control program into data represented in a data format used by the electronic parts 15 of the respective component units 3A to 3D, 4A to 4D, 5, 6 for each function are previously stored in the memories 61 of the respective component units 3A to 3D, 4A to 4D, 5, 6 as objects. However, the present invention is not limited thereto and necessary electronic parts 15 such as actuators, sensors and so on are contained in the body unit 62, a data structure representing characteristic information on the electronic parts 15 in addition to shape information, motion information and positional information, a method for reading the data structure from objects, a conversion program for converting predetermined data represented in a predetermined data format beforehand determined by a control program into data represented in a data format used by the electronic parts 15 of the body unit 2 for each function can be previously stored in the memory 13 as objects, such that the CPU 10 reads the objects from the memory 13 to control the operation of the body unit 62 based on the read objects.

Here, the CPU 63 is configured to read the objects from the memory 13 of the body unit 62, when the robot 1 is powered on, or when one of, a plurality of, or all of the component units 3A, 3B, 3C, 3D, 4A, 4B, 4C, 4D, 5, 6 are replaced with component units of different type.

Furthermore, while in the aforementioned third embodiment, a data structure representing shape information, motion information and characteristic information, a method for reading the data structure, and a conversion program for converting first data represented in a predetermined data format commonly determined beforehand for each function by a control program into second data represented in a data format used by the respective electronic parts 15 for each function thereof are stored in the memories 61 of the respective component units 3A to 3D, 4A to 4D, 5, 6 as objects, however, the present invention is not limited thereto and the aforementioned data structure, the method and the conversion program can be stored in the memories 61 of the respective component units 3A to 3D, 4A to 4D, 5, 6 without treating them as objects.

According to the present invention as described above, a robot apparatus composed of a plurality of component units comprises first storage means for storing shape information for determining shapes of the component units, second storage means for storing motion information required to describe motions of the component units, third storage means for storing characteristic information on electronic parts contained in the component parts, and a detecting means for detecting coupling states of the respective component units, so that control means can automatically recognize the entire structure of the robot apparatus and motion characteristics of the respective component units based on detection results of the detecting means, thus making it possible to realize a robot apparatus which can be applied to a configuration including two or more separate groups of arbitrary component units combined into a complete assembly, and thus facilitate the architecture of a robot in a new form.

Also, according to the present invention, the storage means of the respective component units constituting a robot apparatus stores a conversion program for converting first data represented in predetermined data format commonly determined beforehand for each function by a control program used by the control means for controlling the respective component units into second data represented in a data format used by the respective electronic parts for each function, so that the respective component units can be designed independently of the data format determined beforehand by the control program. It is therefore possible to realize a robot apparatus which can remarkably improve the degree of freedom in designing of the respective component units.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A robot apparatus composed of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units; and detecting means for detecting coupling states of said respective component units, wherein at least one of said component units is removable from said robot apparatus, and at least another of said components is replaceable in place of said removable component unit.

2. A robot apparatus comprised of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units; and detecting means for detecting coupling states of said respective component units;

said shape information including, when assuming a predetermined coordinate system and coordinate axes for said component units, coupling positions of said component unit with one or more of the remaining component units, the position of the center of rotation and the direction of rotation on said coordinate system when said component unit is rotated, and the position of the origin of a linear motion on said coordinate system when said component unit is linearly moved.

3. A robot apparatus comprised of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units; and detecting means for detecting coupling states of said respective component units;

said motion information including, when assuming a predetermined coordinate system and coordinate axes for said component units, the position of center of gravity for said component unit on the coordinate system, mass of said component unit, and magnitude of rotation moment of said component unit.

4. A robot apparatus comprised of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units; and detecting means for detecting coupling states of said respective component units;

said characteristic information on said electronic parts including a number corresponding to an indexed characteristic table previously contained in said control means.

5. A robot apparatus comprised of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units; and detecting means for detecting coupling states of said respective component units;

said detecting means comprising:

first information detecting means for detecting, in order from said component unit on a zeroth layer holding said control means, information including said shape information on said component unit on a first layer coupled to an arbitrary coupling position of said component unit on the zeroth layer; and second information detecting means for detecting, when said component unit on a layer other than an (L−1)th layer coupled to said component unit on an Lth layer is said component unit on an (L+1)th layer, information including said shape information on said component unit on the (L+1)th layer coupled to an arbitrary coupling position of said component unit on the Lth layer, where L is an integer equal to or larger than zero.

6. A robot apparatus comprised of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units; and detecting means for detecting coupling states of said respective component units;

said detecting means repeatedly checking the coupling states of said respective component units at predetermined intervals.

7. A robot apparatus comprised of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units; and detecting means for detecting coupling states of said respective component units;

said detecting means detecting the coupling states when said respective component units have changed the coupling state.

8. A robot apparatus comprised of control means for controlling the entire robot apparatus and a plurality of component units each containing electronic parts including an actuator and a sensor for measuring a predetermined physical amount, said robot apparatus comprising:

first storage means for storing shape information for determining shapes of said component units;

second storage means for storing motion information required to describe motions of said component units;

third storage means for storing characteristic information on said electronic parts contained in said component units;

detecting means for detecting coupling states of said respective component units; and display means for visually displaying said coupling states of said respective component units based on outputs of said detecting means.

9. The robot apparatus according to claim 8, comprising driving information output means for specifying a predetermined one of said component units and for outputting information for driving said specified component unit in a predetermined state, wherein said control means forces said corresponding component unit to execute a specified operation based on an output of said driving information output means.

10. A robot apparatus composed of one or a plurality of component units, comprising:

logical means for logically combining said component units in accordance with a tree structure to configure one or more sites;

goal generating means for forcing each of said sites to independently generate a predetermined first action goal;

input means for inputting a second action goal outputted from a higher rank of said tree structure;

selecting means for selecting one of said first and second action goals from said first and second action goals;

output means for outputting said first or second action goal selected by said selecting means to a lower rank of said tree structure;

generating means for generating an action at a current time from said first or second action goal selected by said selecting means; and operation instruction generating means for generating an operation instruction to an actuator for driving a corresponding one of said component units from said action at the current time.

11. A robot apparatus comprising:

control means for controlling the entire robot apparatus; and a plurality of component units each containing electronic parts including at least an actuator and/or a sensor for measuring a predetermined physical amount, wherein each of said component units has storage means for storing a conversion program for converting first data represented in a predetermined data format commonly determined beforehand for each function of said electronic parts by a control program used by said control means for controlling said component units into second data represented in a data format used by said electronic parts for each function, wherein at least one of said component units is removable from said robot apparatus, and at least another of said components is replaceable in place of said removable component unit.

12. The robot apparatus according to claim 11, wherein said storage means of said respective component units stores characteristic information on said electronic parts corresponding thereto, shape information for determining the shape of said component unit corresponding thereto, a data structure representing motion information required to describe motions of said component unit corresponding thereto, and an information reading program for reading said data structure.

13. A robot apparatus comprising:

control means for controlling the entire robot apparatus; and a plurality of component units each containing electronic parts including an actuator and/or a sensor for measuring a predetermined physical amount, wherein each of said components has storage means for storing a conversion program for converting first data represented in a predetermined data format commonly determined beforehand for each function of said electronic parts by a control program used by said control means for controlling said component units into second data represented in a data format used by said electronic parts for each function;

said storage means in said respective component units storing a data structure representing characteristic information on at least said electronic parts corresponding thereto, and an information reading program for reading said data structure, which is common for all of said electronic parts, representing the characteristic information on at least said electronic parts.

14. The robot apparatus according to claim 13, wherein said control means reads said conversion program and said information reading program from said storage means of said component units and reads said data structure based on said information reading program, and then converts, based on said first program, first data represented in a predetermined data format commonly determined beforehand for each function of said electronic parts into second data represented by a data format used by said electronic parts for each function, and sends a control signal corresponding to said second data to said electronic parts, in order to control operations of said electronic parts.

* * * * *